United States Patent [19]
Okisu et al.

[11] Patent Number: 5,377,019
[45] Date of Patent: Dec. 27, 1994

[54] DOCUMENT READING APPARATUS HAVING A FUNCTION OF DETERMINING EFFECTIVE DOCUMENT REGION BASED ON A DETECTED DATA

[75] Inventors: Noriyuki Okisu, Sakai; Shinya Matsuda, Kyoto; Satoshi Nakamura; Jun Minakuti, both of Amagasaki, all of Japan

[73] Assignee: Minolta Co., Ltd., Osaka, Japan

[21] Appl. No.: 983,672

[22] Filed: Dec. 1, 1992

[30] Foreign Application Priority Data

Dec. 2, 1991 [JP] Japan ................................ 3-348001
Aug. 24, 1992 [JP] Japan ................................ 4-248757

[51] Int. Cl.⁵ .......................................... H04N 1/38
[52] U.S. Cl. .................................. 358/464; 358/463; 358/448
[58] Field of Search ............... 358/448, 452, 453, 463, 358/464, 467, 474, 488, 494, 80, 75; 382/4, 54, 58, 59, 62, 63; 250/208.1, 208.2, 216, 221, 222.1; H04N 1/40, 1/38, 1/46

[56] References Cited

U.S. PATENT DOCUMENTS

| | | | |
|---|---|---|---|
| 3,801,823 | 4/1974 | Korn | 250/221 |
| 4,958,217 | 9/1990 | Kimura et al. | 358/75 |
| 5,019,917 | 5/1991 | Hata et al. | 358/464 |
| 5,084,611 | 1/1992 | Okiso | 250/208.1 |

*Primary Examiner*—Richard Hjerpe
*Assistant Examiner*—Jerome Grant
*Attorney, Agent, or Firm*—Price, Gess & Ubell

[57] ABSTRACT

A document reading apparatus which can determine an effective image pickup area containing no object such as operator's hands or fingers pressing a document and rectify image data prior to imaging operation, making use of a difference of the object from the document in chromaticity, luminous density, and the like.

24 Claims, 16 Drawing Sheets

FLESH COLOR BLOCK

DOCUMENT READING APPARATUS HAVING A FUNCTION OF DETERMINING EFFECTIVE DOCUMENT REGION BASED ON A DETECTED DATA

BACKGROUND OF THE INVENTION

The present invention relates to a document reading apparatus for reading a document and for outputting an image signal, especially having a function of determining an effective document region based on a detected data.

Conventionally, an apparatus capable of imaging an original document such as a book which is placed face up on a document holder is known. In an apparatus of this type, usually an operator has to set an imaging region of an original document. In a reading apparatus of the type wherein an original document is set face down on a document holder made of glass so as to be read from below, it is possible to arrange reflection type photo sensors below the glass document holder for detecting automatically size of the document. However, such a construction is hard to be applied to the type wherein the document is set face up to be read from above.

In an apparatus of this type, an operator must pay much attention at the time of imaging operation so that his hands or fingers pressing the document might not enter into the imaging region, since the hands or fingers is occasionally imaged together with the original document, causing the failure of imaging operation.

SUMMARY OF THE INVENTION

An object of the present invention is to provide a document reading apparatus capable of removing an image signal of an object other than document from image signal received from imaging device, if such an object exists on the document, at the time of reading the document placed on the document holder from above by the imaging device.

The above object is achieved, according to the present invention, by a document reading apparatus including means for imaging a document placed on a document holder from above; detecting means for detecting a position of an object other than document placed on the document holder based on an output from the imaging means; and processing means for processing the output from the imaging means based on an output from the detecting means.

A further object of the present invention is to provide a document reading apparatus having a function of determining an effective document region and rectifying an image signal received from imaging device based on a detected signal on a predetermined color, e.g., a flesh color of operator's hands or fingers pressing the document.

According to the present invention, the above object is achieved by a document reading apparatus including a first imaging means for imaging an original document placed on a document holder and obtaining picture element output of three colors, namely, red, green and blue; calculating means for calculating chromaticity of specified two colors from these imaged picture element output of three colors red, green and blue; judging means for judging from the chromaticity of the two colors whether or not the imaged picture element output is of a specified color; a second imaging means for imaging the document and rectifying means for rectifying an output from the said second imaging means on the basis of an output from the judging means.

A furthermore object of the present invention is to provide a document reading apparatus having a function of determining an effective document region by making use of a difference in luminous density between a document region and regions containing hands or fingers, and capable of deleting an image of hands or fingers by image processing, for reproducing good image data.

The above object is achieved by a document reading apparatus including imaging means for imaging a document placed on a document holder from above; detecting means for detecting whether or not an region with above or below a predetermined density exists within the specified portion based on an output from the imaging means in a specified portion of the original document; and processing means for processing an output from the imaging means based on the output from the detecting means.

DETAILED DESCRIPTION OF THE PREFERRED EMBODIMENT

Figure 1:
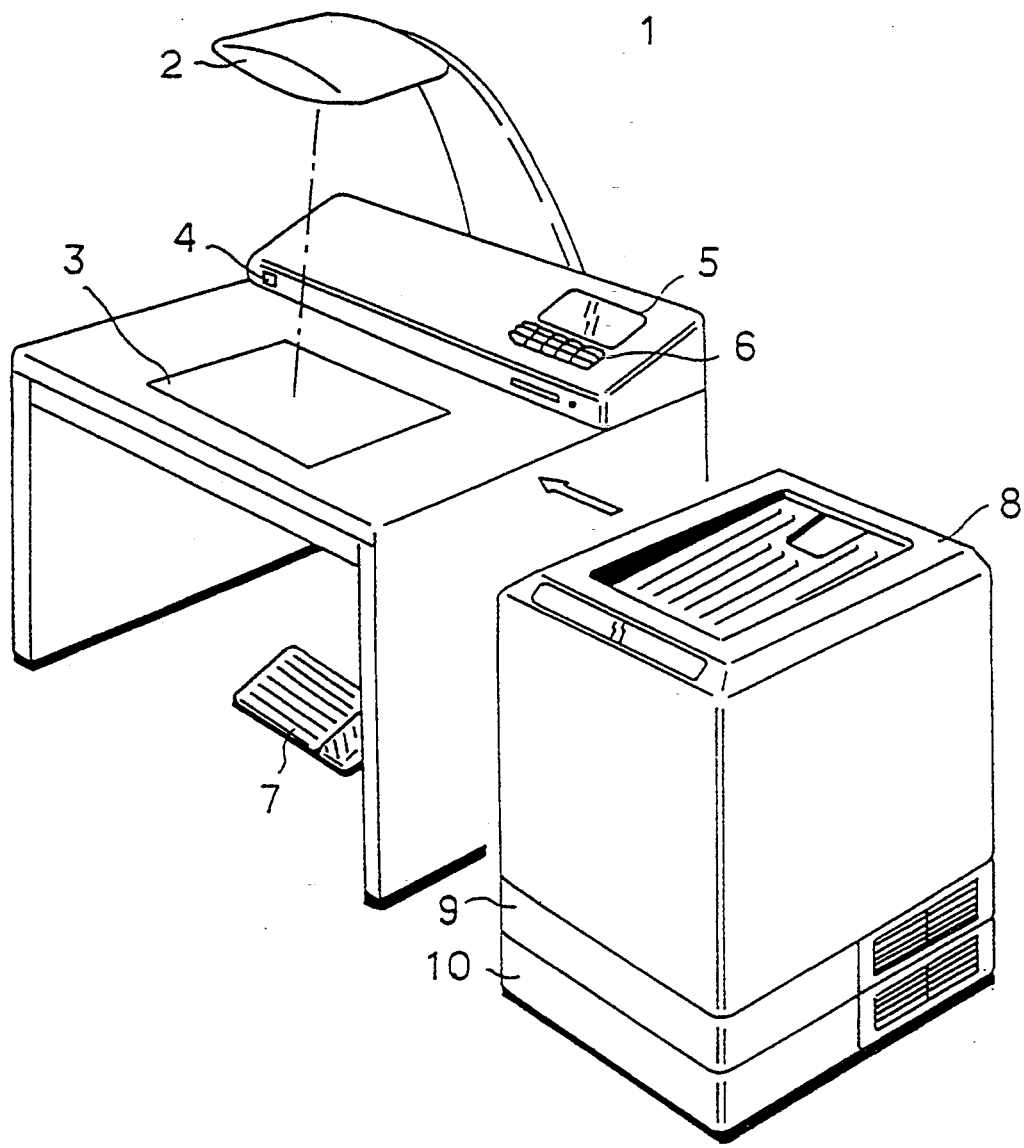
FIG. 1 shows an outward appearance of a document reading apparatus according to the present invention.

Now referring to the accompanying drawings, an embodiment specifying the present invention is explained. FIG. 1 shows an outward construction of a document reading apparatus. This apparatus 1 includes a document holder 3, an imaging section 2 disposed above the holder, a buzzer 4 for alarming at the time of malfunction, a display 5 for displaying temporarily an image of the document to be imaged, an operational switch 6, a foot switch 7, a printer 8 for printing an inputted image, a signal processing unit 9 and a memory device 10 for memorizing an inputted image data. The document placed on the document holder 3 is picked up at the imaging section 2, by switching the operational switch 6 on. The picked up image is converted into an electric signal and applied to the signal processing unit 9, and after being subjected to an appropriate process, can be printed at the printer 8 as well as be registered in the memory device 10.

Figure 2:
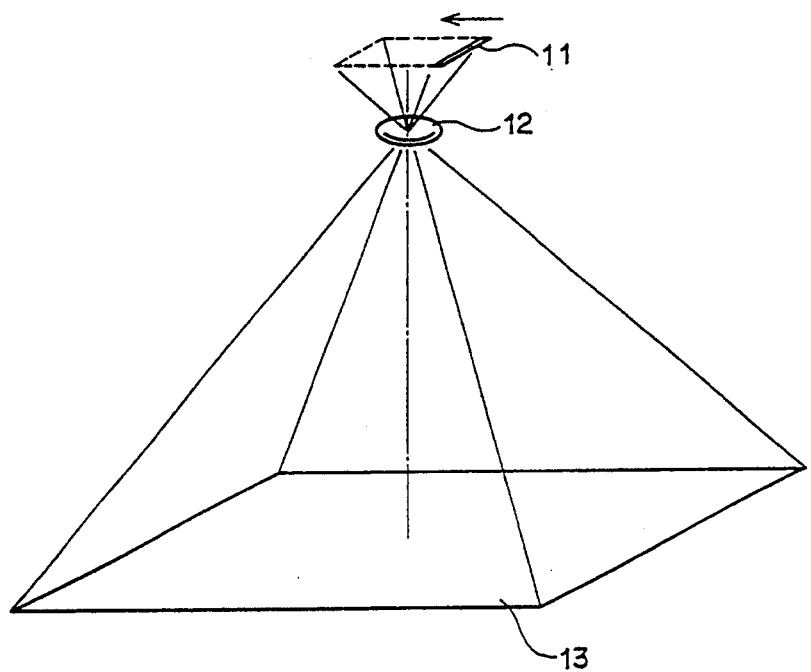
FIG. 2 is a view showing a sensor unit incorporated within an imaging section of the said apparatus and an optical path of an imaging system, according to a first embodiment of the present invention.

FIG. 2 shows a sensor unit incorporated within the imaging section and an optical path of an imaging system containing a lens. The sensor unit 11 includes a line sensor for imaging comprising of CCD (Charge Coupled Device) and the like, a line sensor for detecting a flesh color and a lens 12. By scanning this sensor unit 11 in the direction of an arrow, an area 13 can be imaged.

Figure 3:
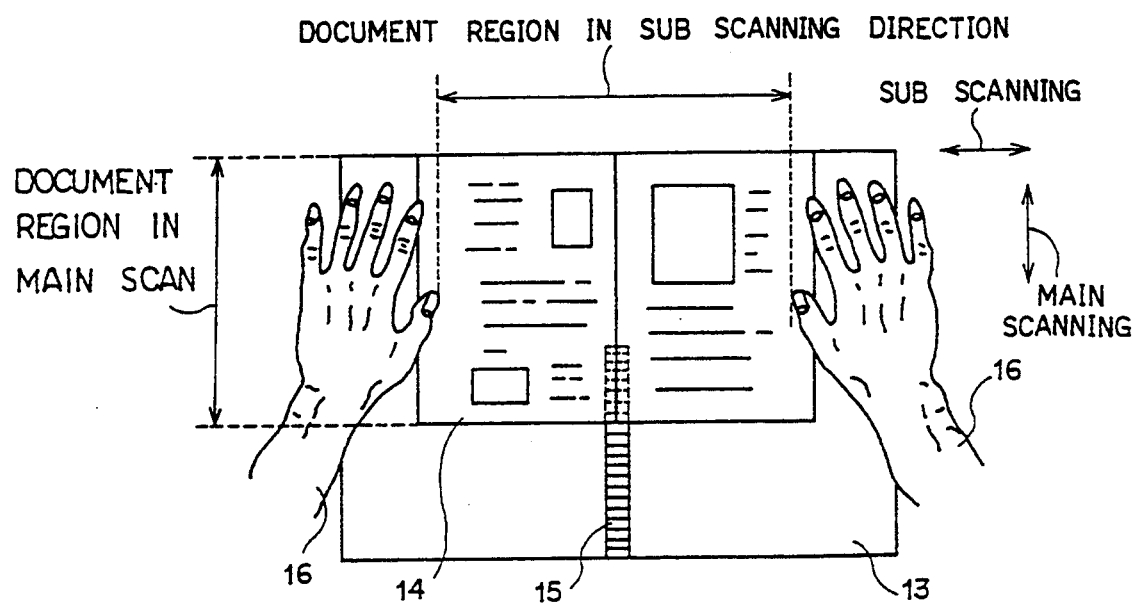
FIG. 3 illustrates an imaging condition as seen from just above a document holder.

FIG. 3 shows the condition at the time of imaging operation, as seen from just above the document holder. The document 14 is placed within the imaging capable area 13 on the document holder. At the center of the imaging capable area 13 on the document holder, a document size detecting sensor 15 is disposed. The document 14 is placed with its upper edge line lying on that of the imaging capable range 13, and with its center line lying on the document size detecting sensor 15, and is pressed by operator's hands 16. The document size detecting sensor 15, comprising Silicon Photo Cell (SPC) array and the like, can detect the document size in the direction of main scanning by checking an output of each SPC, since the incident light into SPC is cut off in the portion whereupon the document 14 is placed. On the other hand, the document size in the direction of sub scanning is detected, by detecting in each line of sub scanning direction whether or not a part of a hand is contained. Namely, an area wherein part of a hand is not contained at all is a document region in the direction of sub scanning.

Figure 4:
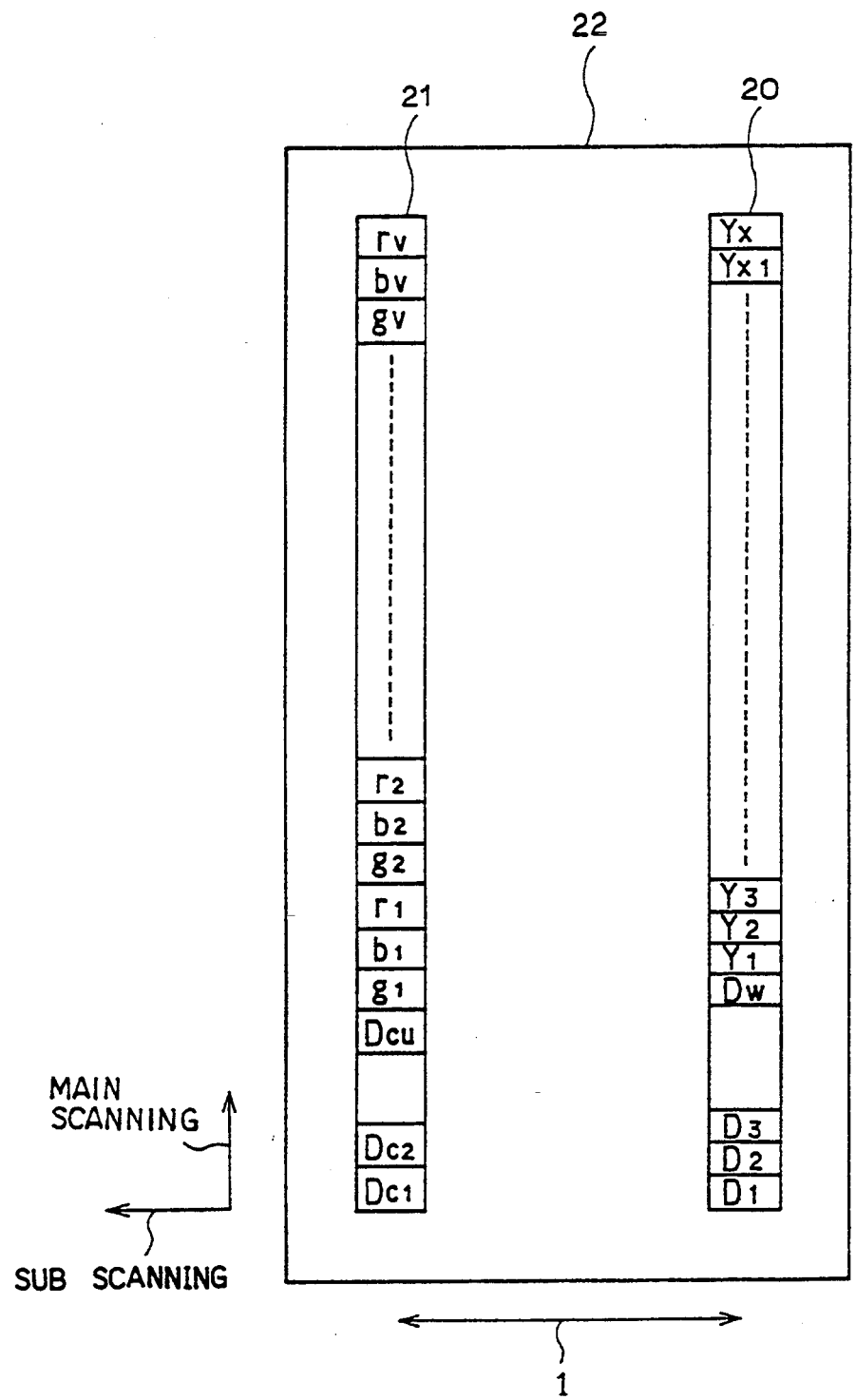
FIG. 4 shows a construction of the sensor unit.

FIG. 4 shows the construction of the sensor unit 11, wherein a monochrome line CCD 20 for imaging and a color line CCD 21 for detecting a flesh color are disposed on a substrate 22 parallel with each other with a distance 1 apart. This substrate 22 is driven in the sub scanning direction. In the monochro CCD 20, D1-Dw are a picture element for monitoring circumstantial brightness, and Y1-Yx are a picture element for imaging. In the color CCD 21, Dc1-Dcu are a picture element for monitoring circumstantial brightness, g1-gv, b1-bv, r1-rv are respectively a picture element of green, blue and red.

Figure 5:
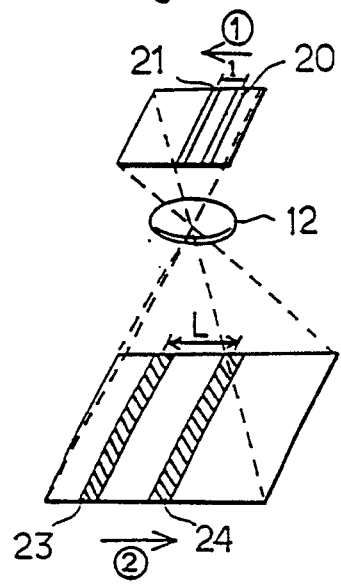
FIG. 5 Illustrates a condition of CCD scanning.

FIG. 5 shows the condition of scanning effected by the CCD 20 and 21. The CCD 20 and 21 scan and image the oblique line portion 23 and 24 through a lens 12. Since the CCD 20 and 21 are disposed parallel with each other by distance 1 apart, the imaging portion 23 and 24 are apart from each other by distance L. Also, since the CCD 20 and 21 scan in the direction of an arrow 1, the imaging areas 23 and 24 move in the direction of an arrow 2.

Figure 6:
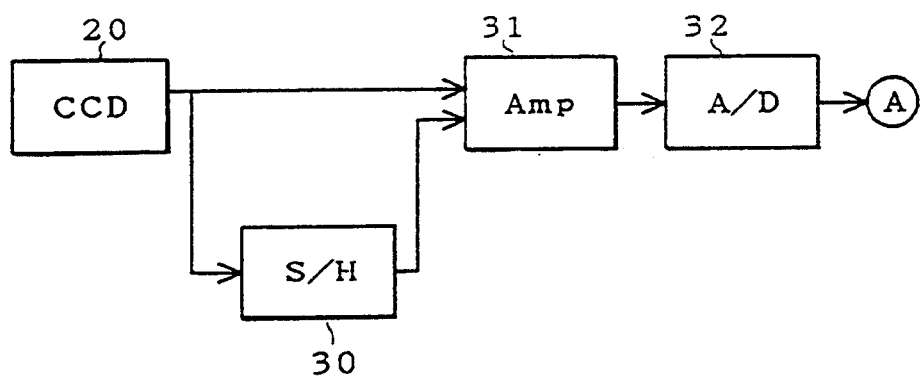
FIG. 6 is a functional block diagram for processing of an image data imaged by a CCD for imaging.
Figure 7:
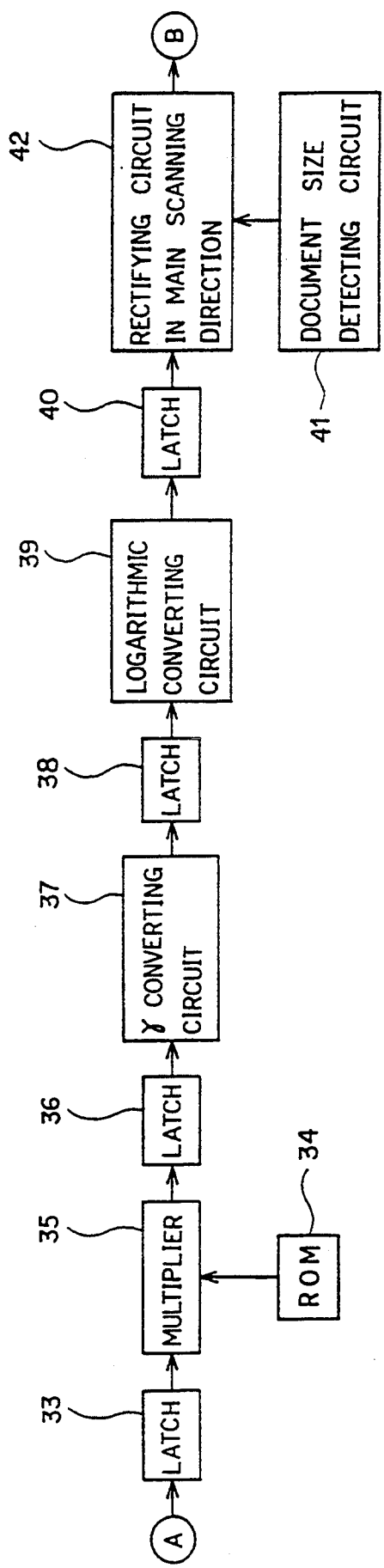
FIG. 7 is a functional block diagram of the same.
Figure 8:
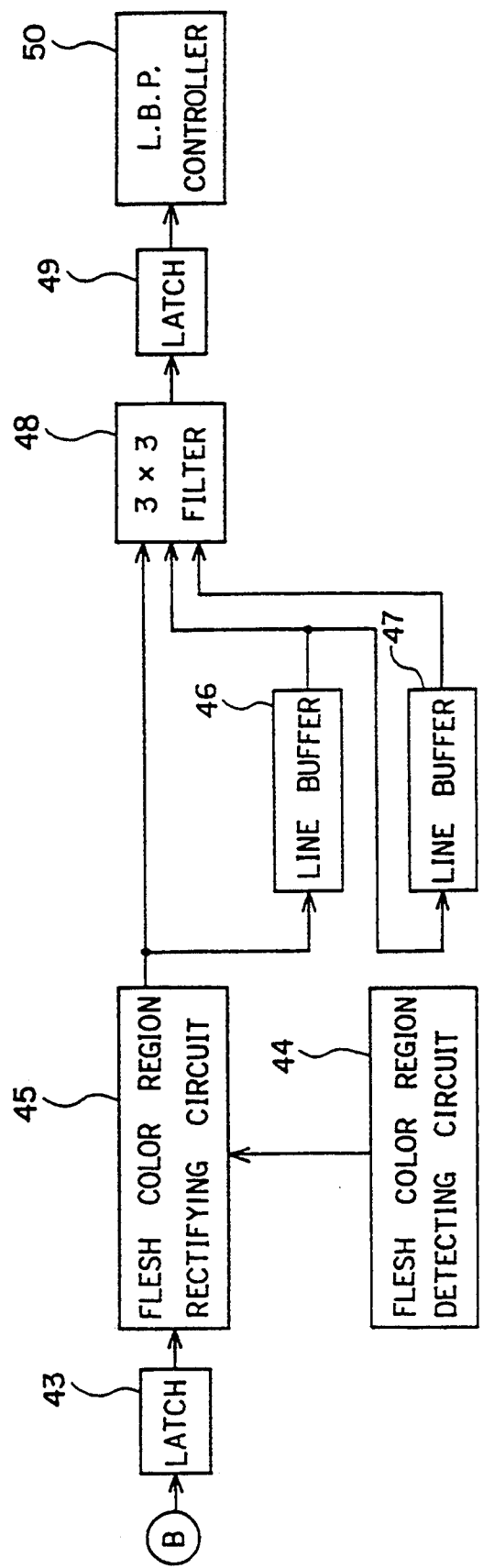
FIG. 8 is a functional block diagram showing the construction of the same.

Next, with reference to block diagrams shown in FIGS. 6–8, explanation is given to the construction and flow of processing of an image data picked up by the monochrome line CCD 20 for imaging. The image data of the CCD 20 is read out sequentially from the picture element D1-Dw and then from the picture elements Y1-Yx. One of the image data among the outputs of D1-Dw firstly read out is extracted and held in a sample hold (S/H) circuit 30, and thus a level for monitoring circumstantial brightness is determined. Consequently, the picture element Y1-Yx for imaging is read out sequentially and inputted into a differential amplifier 31 together with the circumstantial brightness level extracted previously, and then only the signal of truth component is amplified and outputted. The analogue output of a differential amplifier 31 is inputted into an Analogue to Digital (A/D) converter 32, converted into a digital data, and latched in a latch circuit 33.

This latch data is sent to a multiplier 35. A shading correction factor in each picture element of CCD 20 is memorized in a ROM 34, and given to the multiplier 35. Thus the data from the latch circuit 35 is subjected to the shading correction at the multiplier 35. The data subjected to the shading correction, through a latch circuit 36, is subjected to an elimination of foundation and a $\gamma$ conversion so as to be a suitable electrophotography output at a $\gamma$ converting circuit 37.

This output subjected to the $\gamma$ conversion, through the latch circuit 38, is inputted into a logarithmic conversion circuit 39, wherein a data of CCD 20 is converted into a reflection density data through a logarithmic conversion. The data converted into a reflection density, through a latch circuit 40, is sent to a main scanning direction rectifying circuit 42. A document size detecting circuit 41 is a circuit for detecting the size of the document in the main scanning direction based on the output of the document size detecting sensor 15 shown in FIG. 3. The detection output is sent to the main scanning direction rectifying circuit 42, and therein the image data from the latch circuit 40 is rectified based on the output from the document size detecting circuit 41. The contents of the rectification is, for example, to replace all of image data corresponding to an area outside the document in the main scanning direction with data equivalent for white.

The data from the main scanning direction rectifying circuit 42 is sent through the latch circuit 43 to a flesh color region rectifying circuit 45. In a flesh color region detecting circuit 44, construction of which will be described in detail later, a flesh color region within an imaging range is detected, and then detection output is sent to the flesh color region rectifying circuit 45, and therein the image data from the latch circuit 43 is rectified. The content of the rectification is, for example, to replace all of the data corresponding to the flesh color region with the data equivalent for white, or to replace all of the data in a line with the data equivalent for white if there is at least one picture element corresponding to the flesh color region in each line of the sub scanning direction. The output from the flesh color region rectifying circuit 45 is stored as much as 2 lines at a line buffer 46 and 47. Thereafter, the outputs from the flesh color region rectifying circuit 45, the line buffer 46 and 47 are inputted into a 3×3 filter 48, and therein so-called MTF correction such as edge emphasizing, smoothing, and the like is carried out. The data subjected to the MTF correction in the filter 48 is sent through a latch circuit 49 to a laser beam printer (LBP) controller 50 to be printed.

Next, explanation is given to the principle of a flesh color detection. Assuming that the red, green and blue output from the color CCD 21 is r, g and b, respectively, the chromaticity of red and green, R, G is obtained from the following equation:

$$R = r/(r+g+b)$$

$$G = g/(r+g+b)$$

Figure 9:
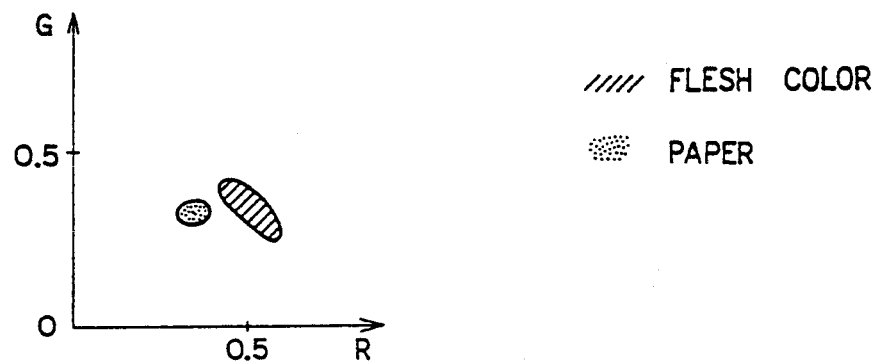
FIG. 9 is a graph showing a flesh color region and a white paper region on R-G chromaticity graph.

FIG. 9 shows a flesh color region (oblique line portion) and a white paper region (dotted portion) on the R-G chromaticity graph. As apparent from FIG. 9, the flesh color region and the white paper region do not overlap on the R-G chromaticity chart. Accordingly, by converting the output data from the color CCD 21 into a R, G chromaticity data, and checking whether its value is within an appropriate range, it can be judged whether the data is of flesh color.

Figure 10:
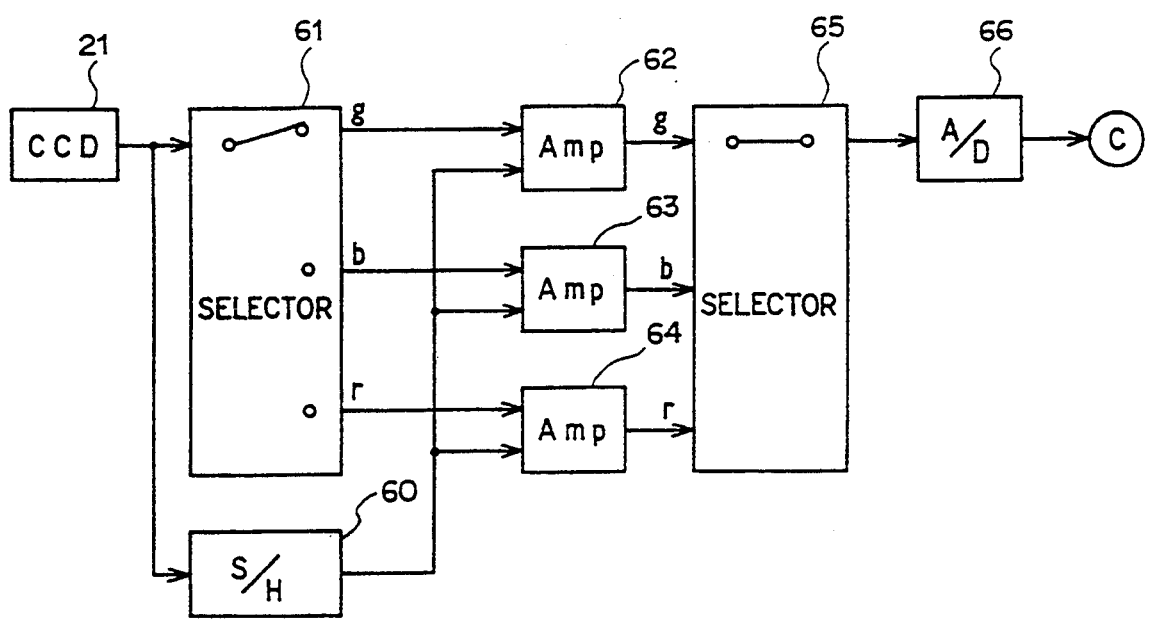
FIG. 10 is a concrete functional block diagram showing flesh color detection.
Figure 11:
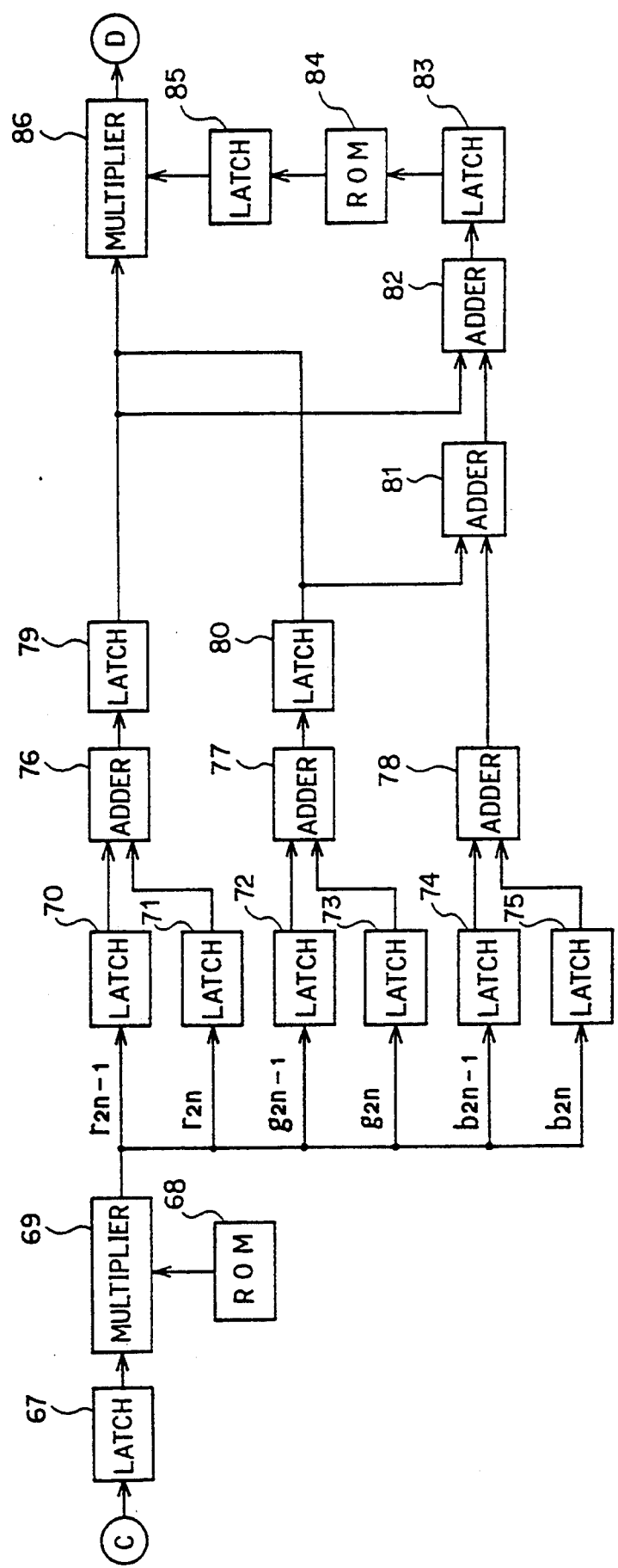
FIG. 11 is a functional block diagram showing the same.
Figure 12:
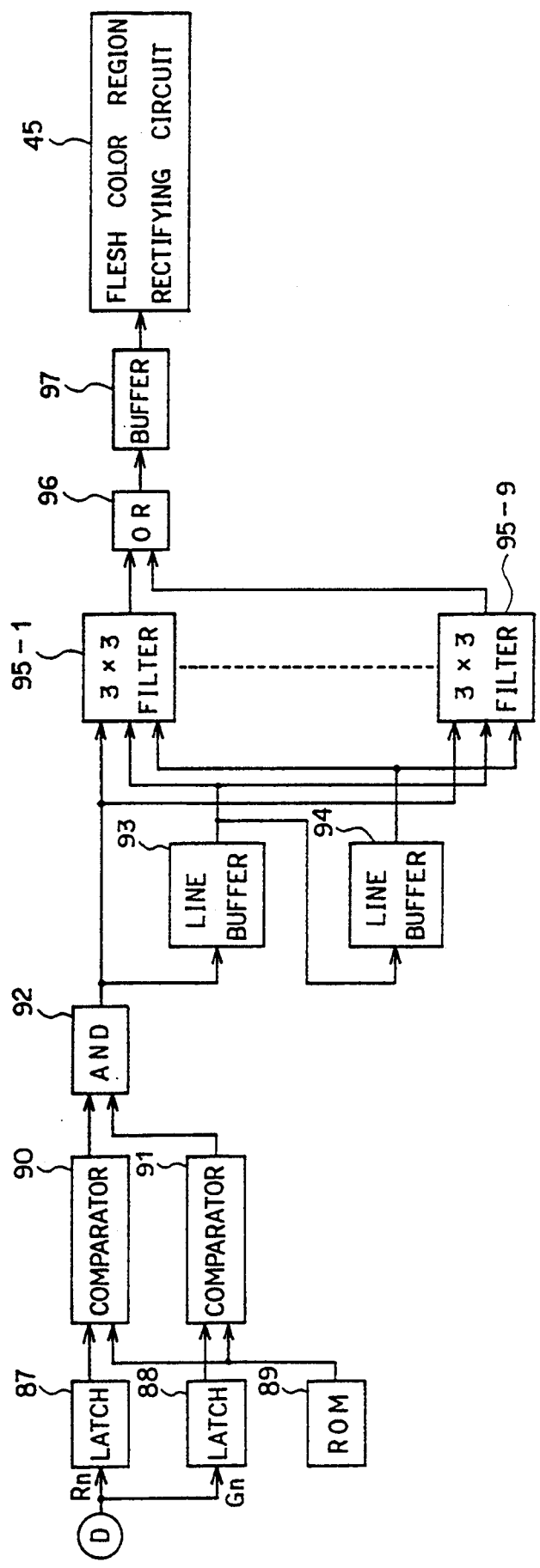
FIG. 12 is a functional block diagram showing the same.

With reference to the block diagrams shown in FIGS. 10–12, the construction and method of flesh color detection is explained specifically. In the present described embodiment, the judgment of flesh color is carried out in each block, comprising of 6 picture elements of red, green and blue. Accordingly, Rn, Gn, a chromaticity of n-th block, is derived from the following equation.

$$Rn = \frac{r_{2n-1} + r_{2n}}{r_{2n-1} + g_{2n-1} + b_{2n-1} + r_{2n} + g_{2n} + b_{2n}}$$

$$Gn = \frac{g_{2n-1} + g_{2n}}{r_{2n-1} + g_{2n-1} + b_{2n-1} + r_{2n} + g_{2n} + b_{2n}}$$

where, $n = 1, 2, 3, \ldots v$

The output data of the CCD 21 is read out consecutively from the picture element Dc1-Dcu, g1, b1, r1-gv, bv and rv. Initially, one of the picture elements which are read out first is held in a sample and hold (S/H) circuit 60, determining a circumstantial brightness output level. Nextly, the picture element g1, b1, r1-gv, bv and rv is read out consecutively, inputted into a differential amplifier 62–64 by a selector 62 and classified in accordance with its color, and therein the difference between the circumstantial brightness output held in the S/H circuit 60 and a color output from the selector 61 is amplified and a signal of truth component is outputted to a selector 65. And therein an output from the output from the amplifiers 62–64 is selected one after another, and inputted into an A/D converter 66. A color data converted into a digital data is latched in a latch circuit 67.

The data latched into the latch circuit 67 is sent to a multiplier 69. The shading correction factor of each picture element of the CCD 21 is memorized in a ROM 68, to be given to the multiplier 69, and thereby the data from the latch circuit 67 is subjected to a shading correction in the multiplier 69. The data from the multiplier 69 is latched in latch circuits 70–75 in accordance with its data: $r_{2n-1}$ is in a latch circuit 70, $r_{2n}$ is in a latch circuit 71, $g_{2n-1}$ is in a latch circuit 72, $g_{2n}$ is in a latch circuit 73, $b_{2n-1}$ in a latch circuit 74, $b_{2n}$ is in a latch circuit 75, respectively. This action is accomplished by controlling a latch enable pulse inputted into each of latch circuit. The data latched in the latch circuits 70–75 is sent to adders 76–78, added in accordance with its color, and thereafter the result of addition is latched into a latch circuit 79 and 80, respectively.

An output from the adder 78 and the latch circuit 80 is inputted into an adder 81, and the addition of green output and blue output is carried out. Further, the output from an adder 81 and a latch circuit 79 are inputted into an adder 82, and red output is added thereto. After the addition of 6 picture elements having been all accomplished, the result is inputted into a ROM 84 through a latch circuit 83. In the ROM 84, it is arranged that an reciprocal number of the inputted data is outputted, which output is sent to a multiplier 86 through a latch circuit 85. The other input into this multiplier 86 is an output from the latch circuits 79 and 80, which are inputted to the multiplier 86 respectively, by controlling an output enable pulse of the latch circuit 79 and 80. In the multiplier 86, the chromaticity Rn and Gn is computed, and the computed result is sent to a latch circuit 87 or 88 in accordance with its color, and inputted into a comparator 90 and 91, respectively.

A comparison data of a comparator 90 and that of 91 is stored in a ROM 89 respectively. In the comparator 90 and 91, it is judged whether each of color data is within a flesh color region, and if being in the region, "High" (truth) is outputted. The output of the comparator 90, 91 are multiplied at an AND circuit 92, and thereafter "High" is outputted, if a block being calculated is flesh-colored, and otherwise "Low" is outputted. The output of the AND circuit 92 is stored as much as 2 lines at a line buffer 93 and 94. Further, the output from the AND circuit 92, the line buffers 93 and 94 are inputted into 9 pieces of 3×3 filter 95-1–95-9, and subjected to a filter processing. This filter processing is carried out for correcting an erroneous judgment, in particular, in regard to the erroneous judgment around the boundary marginal regions between the flesh color region and a non flesh color region on the document.

Figure 13:
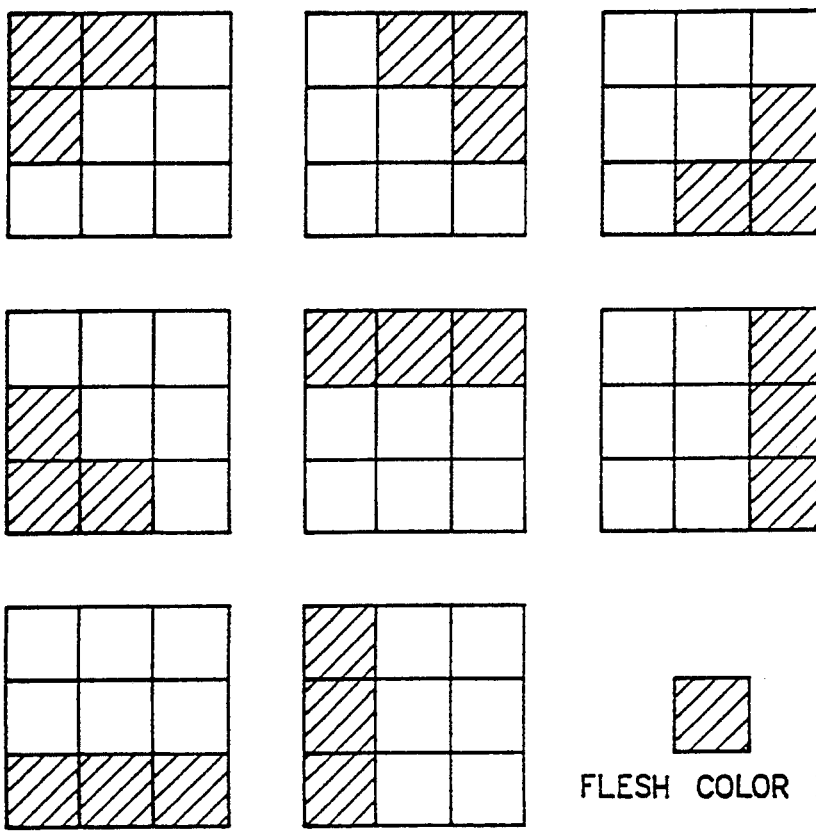
FIG. 13 shows a method of correcting an erroneous judgment.
Figure 14:
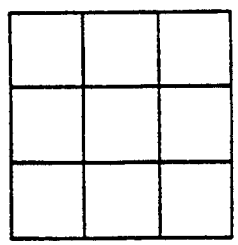
FIG. 14 shows a method of correcting an erroneous judgment.

FIGS. 13 and 14 show the correcting method of the above mentioned erroneous judgment. The oblique line portion represents a block of flesh color. In regard to a center located block, if a flesh color data on 8 blocks enclosing the center block corresponds to at least one of 8 patterns shown in FIG. 13, the center block is regarded as a flesh color block. On the other hand, as shown in FIG. 14, if the enclosing 8 blocks are not a block of flesh color, the center block is regarded as a non flesh color block.

An explanation is given, returning again to FIG. 12. The output from the filters 95-1–95-9 is arranged to be "High" in case a block being calculated is a flesh color block, and otherwise "Low". They are added at an OR circuit 96, then judgment result of flesh color is obtained finally. The output of the OR circuit 96 is temporarily memorized in a buffer 97, and outputted at an appropriate timing to the flesh color region rectifying circuit 45.

In the above described embodiment, it is so constructed that the color CCD 21 firstly scans, and then the CCD 20 for imaging scans the same area a little later. Therefore, since flesh color data is always obtained in advance, it is possible to rectify the imaging data simultaneously.

Figure 15:
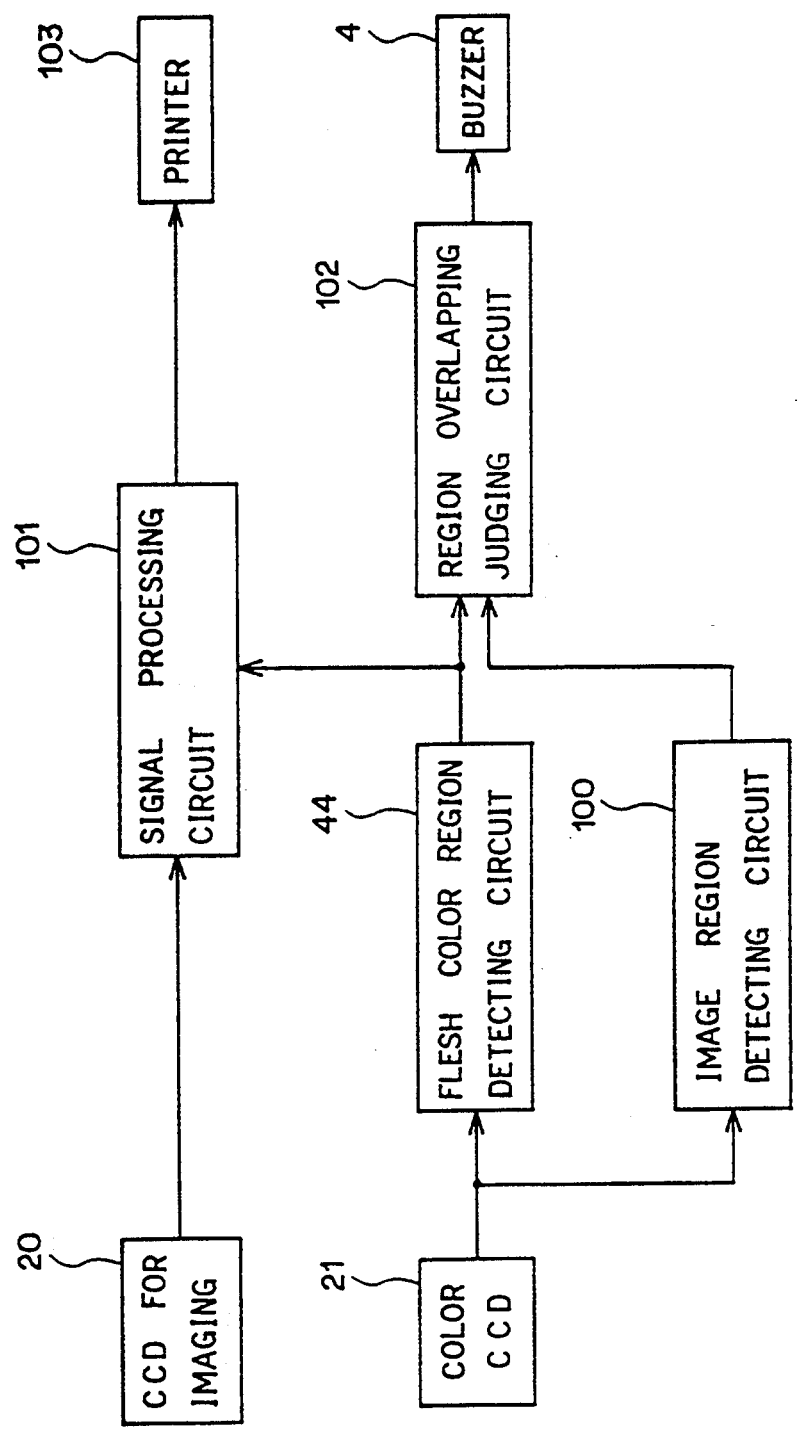
FIG. 15 is a functional block diagram of embodiment about warning in case of hands or fingers placing in an image pickup area.

FIG. 15 shows block construction of an embodiment wherein a warning is issued when a hand or a finger is placed in an image region. In FIG. 15, the image data imaged by the CCD 20 for imaging is sent to a printer 103 through a signal processing circuit described in FIG. 6 to 8. On the other hand, the color data imaged by the color CCD 21 is sent to the flesh color region detecting circuit 44 described in FIG. 10 to 12, and therein the flesh color region is detected. The result is sent to a signal processing circuit 101. Also, the data obtained by the color CCD 21 is sent to an image region detecting circuit 100, too.

When imaging a document including characters, an area wherein outputs of r,g and b are approximately equal and further an output value is small (brightness is low) indicates that a document is black, namely, the area is the region of characters. Therefore, in an image region detecting circuit 100, it is detected whether or not the above described character region exists in each line of sub scanning direction. The detecting output of the flesh color region and character region is sent to a region overlapping judgment circuit 102, and therein whether both regions overlap or not is judged. In case of overlapping, a buzzer 4 is sounded for warning the operator. Thus it is prevented that the image region within a document is pressed by the hand. Also, the warning s not restricted to a buzzer but becomes possible by lighting Light Emitting Diode (LED), for example.

The present invention is not limited to the above-described embodiment, but may be practiced or embodied in still other ways without departing from the spirit or essential character thereof. For instance, the color CCD 21 and the CCD 20 for imaging do not have to belong to an identical optical system, as long as a positional relationship between two areas being scanned by both of CCD is understood. Both of CCD are not restricted to a line sensor, but replacable by an area type sensor or a multi line type sensor. The color CCD 21 may be replaced by that of 3 plates type or filter changeover type. Any of sensor which can obtain output of r, g and b may be used.

Also, by covering the operator's hand or finger pressing the document with gloves or finger stalls of a predetermined color, it becomes possible to detect hands or fingers based on a chromaticity value of that color. In this way, it is possible to prevent an erroneous judgment in case of imaging a document having a chromaticity value similar to that of flesh color. Also, in place of the color CCD, an infrared line sensor is usable for detecting hands or fingers by detecting an infrared rays generated from human body. In this way, an erroneous judgment can be prevented at the time of imaging of photographs or color printed matters.

Second embodiment of the present invention will be explained hereinafter. The outside construction of a document reading apparatus in this embodiment is the same as shown in FIG. 1. The sensor unit incorporated within the imaging section and an optical path of imaging system by an imaging lens is similar to that of FIG. 2, except that the sensor unit includes only a monochrome line sensor for imaging which comprises CCD and the like.

Figure 16:
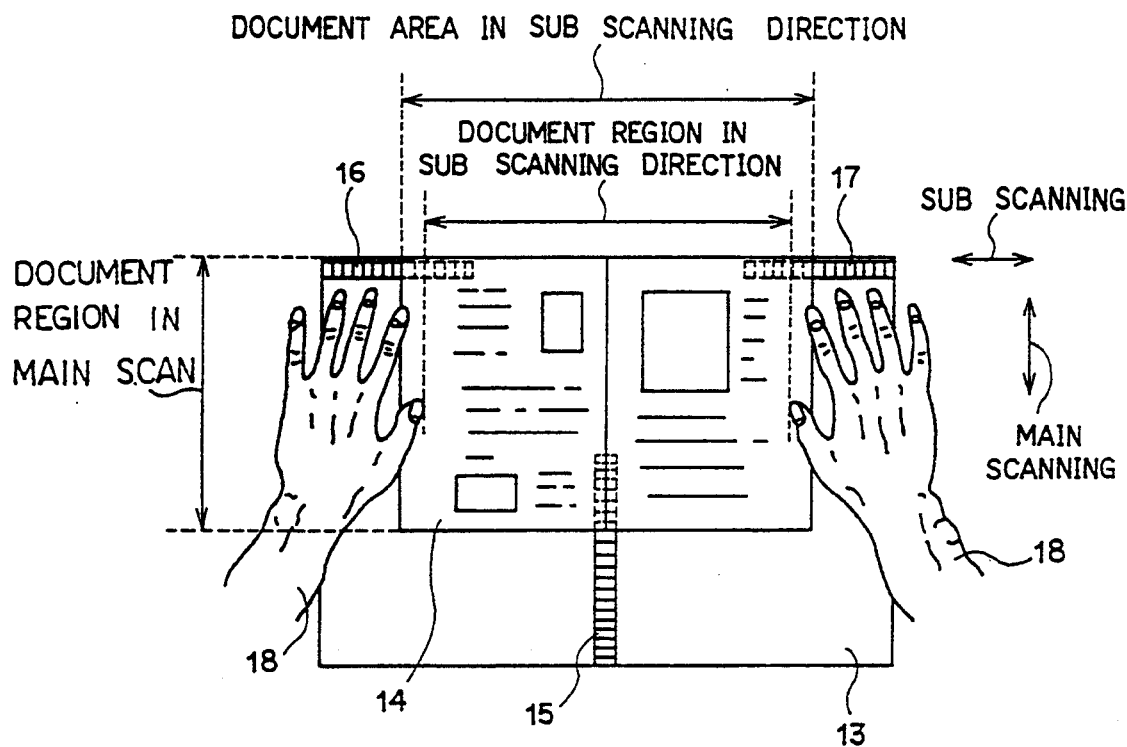
FIG. 16 illustrates an imaging condition as seen from just above a document holder.

FIG. 16 shows the condition of imaging as seen from just above the document holder 3. A document 14 is placed within an imaging capable area 13. A document size detecting sensor 15 in the main scanning direction is disposed at the center of imaging capable area 13 over the document holder, and document size detecting sensors 16 and 17 in the sub scanning direction are at both upper edges of the area 13. The document 14 is placed with its upper edge line lying on the upper edge line of the imaging capable area 13, with its center line lying on the above sensor 15, and pressed by an operator's hand 18. Each of a document size detecting sensor 15, 16, and 17 is constructed by arranging photoelectric conversion elements in line such as phototransistor. Since an incident light entering into the element is cut off when the document 14 is placed on the document holder, the size of the document 14 in the direction of main scanning and sub scanning can be detected by checking an output of each element, and thereby a document area is determined. Further, within the document size in the direction of sub scanning, the area wherein the hand 18 is not contained at all is determined to be an effective document region. This is determined by detecting in each line of sub scanning direction whether or not the hand 18 is contained.

Figure 17:
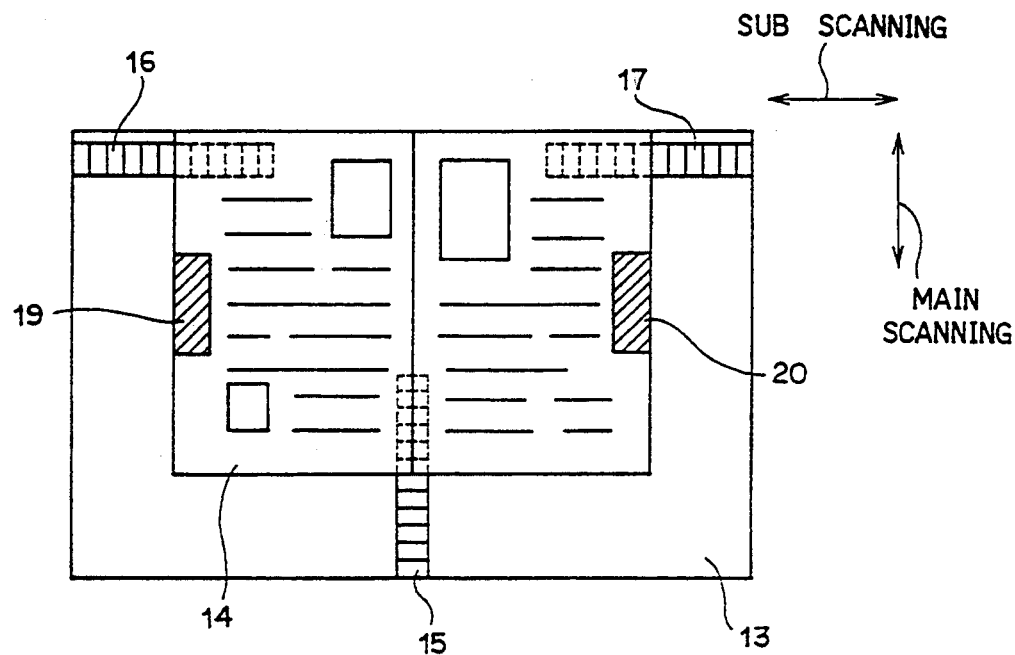
FIG. 17 shows a detecting region of hands and fingers.

The detection of hands or fingers in each line of sub scanning direction needs not to be carried out in every line of sub scanning direction but only in lines around both side edges wherein most probably hands or fingers are placed. Thus loss of time used for unnecessary detecting operation is eliminated, and erroneous detection can be prevented. Hereinafter, with regard to an area wherein hands or fingers are detected, explanation is given with reference to FIG. 17. The area of hand or finger detection determined on the basis of the left and right side edges of the document 14 and the center of main scanning direction, for example, inside 30 mm in the sub scanning direction from the left and right edge lines of the document, and ±50 mm in the main scanning direction from the center position of the main scanning direction. The oblique line portions in FIG. 17 are detection areas 19 and 20 wherein hand or finger is detected. The left and right side edges of the document 14 are detected by the document size in sub scanning direction detecting sensors 16 and 17, and the center in the direction of main scanning direction is detected by detecting a document size in the main scanning direction by a document size in main scanning direction detecting sensor 15. These detection areas 19 and 20, usually corresponding to a blank region of the document, are tend to be pressed by hands or fingers. It is also possible to recommend that a user press this area. The area of hand or finger detection 19 and 20 is not restricted to the position shown here, but possible so long as being a part of the document (and a region wherein hand or finger is placed with a high probability), for example, not restricted to the main scanning direction, but solely to the sub scanning direction.

Figure 18:
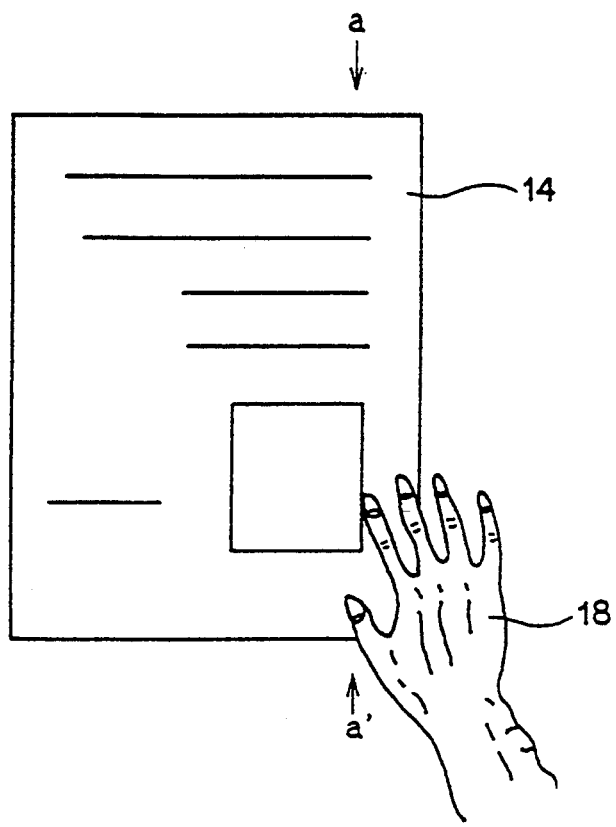
FIG. 18 shows an imaging condition as seen from just above a document holder.
Figure 19:
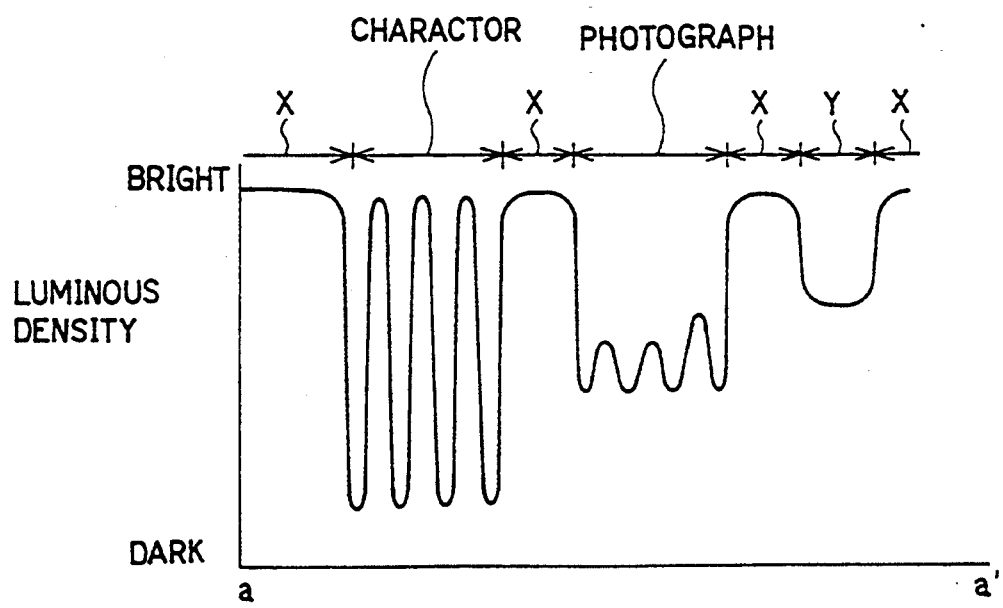
FIG. 19 is a graph showing a difference of each region in luminous density.
Figure 20:
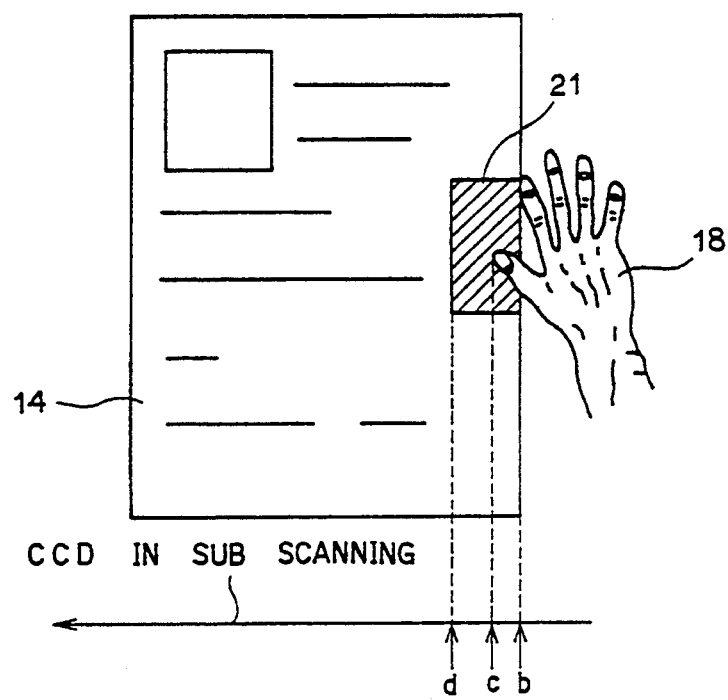
FIG. 20 illustrates a method of detecting hands or fingers.

The method of detecting finger or hand is explained with reference to FIGS. 18–21. Since a paper color of a book and the like is usually white, as shown in FIG. 18, luminous density distribution along the line a-a' when placing a hand 18 on the original document 14 is as shown in FIG. 19 and indicates the difference in density between a paper color region X and a hand region Y of a hand 18. The detection of hand or finger is executed by making use of tills difference in density. As shown in FIG. 20, in case a right page of the document 14 is imaged, an area 21 of hands or fingers detection becomes around the center of main scanning direction at the right side edge of the document 14. The sub scanning by CCD is executed in the direction of an arrow, and detects fingers or hands in each line within the area 21 of hands or fingers detection.

Figure 21:
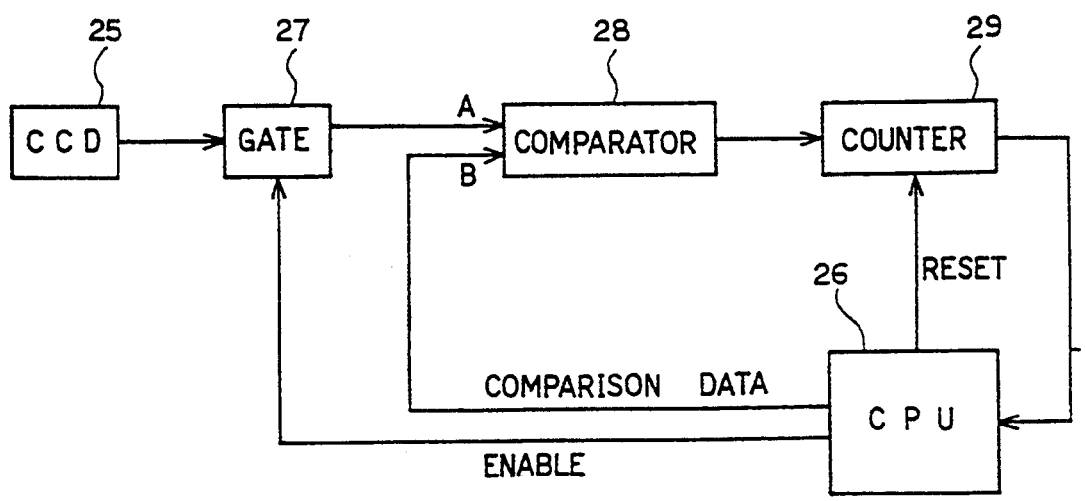
FIG. 21 is a block diagram showing a circuit for detecting hands or fingers.

FIG.21 shows a block construction of circuit for detecting hands or fingers. Central Processing Unit (CPU) 26 loads in advance a comparison data B equivalent to a little higher luminous density than that of hand or finger, as a comparison data, given to a comparator 28, prior to the detection of hand or finger. Also, the CPU outputs to a gate 27 such a control signal as rendering enable only for those which exist within a hand or finger detection area (21 in FIG. 20) among the outputted data row of main scanning direction and as making all data outside of this area white data (lowest in luminous density). Although the CPU 26 ignores signals from a counter 29 until the CCD 25 begins to scan the right edge (line b in FIG. 20) of the document 14 (line b in FIG. 20), upon scanning a line b, the detection of hand or finger is started. The output from the CCD 25 is inputted in the gate 27. and the data A outputted from the gate 27 is inputted into a comparator 28. At the comparator 28, the data A is compared with the data B loaded in advance, and then only when the data A exceeds the data B in density, one pulse is generated. In other words, since the data on the outside of hand or finger detection area 21 is, as above stated, all inputted into a comparator 28 as white data, a pulse is not generated. However, when the data within the hand or finger detection area 21 and corresponding to hands or fingers is inputted, a pulse is generated. This pulse is counted at the counter 29, and the scan of one main scanning line having been completed, the CPU 26 reads the output from the counter 29 and resets the counter 29 at the same time. In case the output of counter 29 exceeds a predetermined value, the CPU 26 determines that a hand or a finger exists in the line.

A series of operations as above described is repeated in each line in the direction of sub scanning. For example, in case the line (line c in FIG. 20) wherein a hand or finger is not detected appears within the detection area 21, a region up to line c is regarded as an area wherein a finger or hand exists. Also, in case hands or fingers is not detected even though CCD 25 having scanned up to the left edge position (line d in FIG. 20) of the detection area 21, the operation for detecting hand or finger is not performed thereafter.

Also, it is in order to prevent erroneous judgment from occurring due to a character or stain on the document that the pulse is counted in the counter 29 and then the existence of fingers or hands is judged depending on the count number of the counter 29. The comparator 28 generates a pulse when there is a character or a stain on the document, even if hand or finger does not exist. However, because the pulse number generated is not so large as when a finger or a hand exists, it is possible to prevent erroneous judgment by making use of the difference of pulse number generated.

Figure 22:
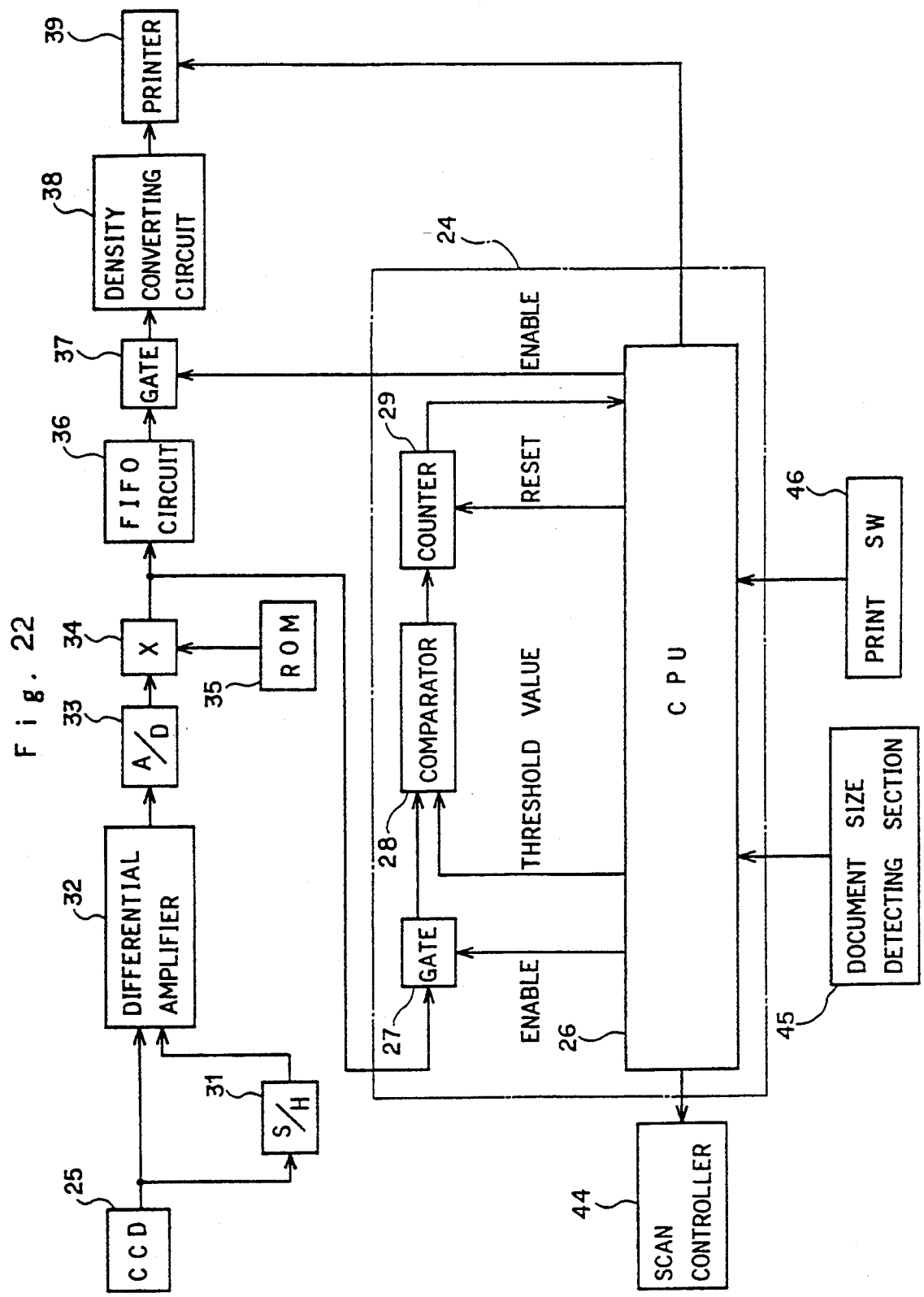
FIG. 22 is a block diagram for a processing of an image data imaged by CCD.

Nextly, explanation is directed to a construction for processing image data imaged by CCD in the document reading apparatus in the present described embodiment. It is assumed that the document is imaged in each one page, namely, the lateral half of two pages spread out. FIG. 22 is a block diagram showing an image data processing. When a print SW 46 is switched on, the CPU 26 determines the document size in the direction of main scanning and the hand or finger detection area in the direction of main scanning on the basis of the output from the document size detecting section 45, and outputs an enable signal to the gate 27. Thereafter, through the scan controller 44, the CCD 25 starts scanning in the direction of sub scanning. The output of a black picture element which appears first among the outputs from the CCD 25 in reading in the direction of main scanning is held in a sample and hold (S/H) circuit 31, and a difference from the output from the CCD 25 is amplified in a differential amplifier 32.

An analog output from the differential amplifier 32 is inputted in an A/D converter 33, and converted into a digital data. The data converted into a digital data is sent to a multiplier 34, multiplied with a data generated from ROM 35, and shading correction is performed in the direction of main scanning. The data subjected to the shading correction is divided into two groups, and one is sent to the hand or finger detection circuit 24, and then the above described operation for detecting hands or fingers is carried out. The other is sent to a FIFO (first in, first out) circuit 36 so that the data is delayed as much as one line. After the data of one line is all read out, the CPU 26 controls a gate 37 as disable if a finger or hand exists in the line, and controls as enable if not existing. In case the gate 37 is disable, all of the output is rendered white data, and accordingly all of the line wherein hand or finger exists is replaced with white data, and consequently an image of hand or finger is deleted. On the other hand, in case the gate 37 is enable, the output of the gate 37 is converted from a brightness data to a density data in a density conversion circuit 38, and then is sent to a printer 39 and printed. The CPU 26 repeats this series of operation until the one page of the document has been scanned in the direction of sub scanning.

Also, in the above described embodiment, the data on the line wherein hands or fingers exist is replaced with white data and subject to a print output. However, it may be possible for the CPU 26 to control the printer 39 so as to start printing from the line wherein hands or fingers do not exist.

In this way, making use of the difference in luminous density between the area of paper or character of the document and that of hand or finger, without using a color sensor, only a monochrome line sensor for imaging allows to detect hands or fingers. Thus low cost and a simple construction of the detecting circuit for detecting hands or fingers are realized. Further, by processing the imaging output based on the result of detection of finger or hand, an appropriate output is obtainable with the data on the hand or finger pressing the document deleted.

Figure 23:
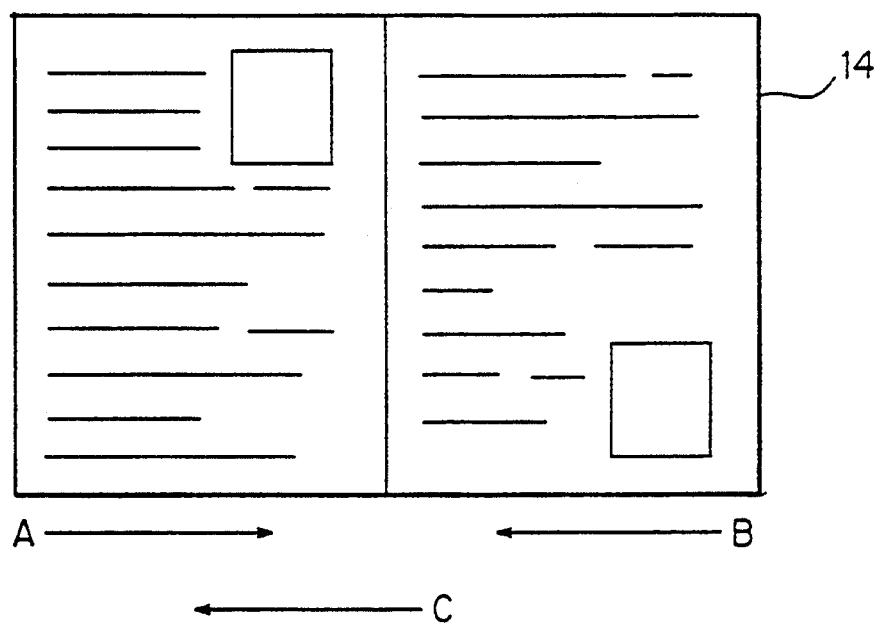
FIG. 23 shows a sub scanning direction of CCD.

Further, in the present described embodiment, the scanning in the sub scanning direction by CCD is required to be effected from the side wherein hands or fingers are placed to a center of the document. Namely, as shown in FIG. 23, a left page is scanned in the direction of an arrow A, a right page in the direction of an arrow B. However, since a direction of printing output is predetermined, if a scanning direction of the right page becomes the reverse of the left page, a print output of one page is reversed. Also, in case of imaging two pages spread out, only the hands or fingers contained in one page are deleted. Therefore, in case of the right page, scan is performed in the direction of an arrow B, and in case of the left page, pre-scan is performed in the direction of an arrow A prior to imaging for detecting and memorizing areas wherein hands or fingers exist. Thereafter, a scan is performed in the direction of an arrow C for deleting the images of hands or fingers while imaging.

In this way, by detecting hands or fingers in the pre-scanning and by processing an imaging output based on the detecting result in the scanning, the problem such as reverse of left and right pages can be solved in case of using a line sensor, and also usable for the document of two pages spread out, too.

Although, the invention has been described with reference to specific embodiments, it shall be understood by those skilled in the art that numerous modifications may be made within the spirit and scope of the inventive contribution. For example, it may be possible to arrange that a pre-scan is always performed for detecting hands or fingers and in case hands or fingers exist over the areas of hand or finger detection, warning to the operator may be done without the deletion of hands or fingers. Also, it may be possible to arrange that it is selected whether or not the detection of hands or fingers is performed. Also, a sensor for imaging is not restricted to a line sensor, but an area sensor or a color sensor may be used for the same purpose. Also, it may be possible to determine the area of hands or fingers detection not based on the result of document size but on the data on the document size inputted from the outside. Also, it may be arranged that the scanning is started from the side wherein hands or fingers do not exist (center of the document). In this case, it is after entering into the area of hand or finger detection that a delete of region over the line wherein hands or fingers exist is started. Further, if it is arranged that the right page is scanned from the side wherein hands or fingers exist and that the left page is scanned from the side wherein hands or fingers do not exist, the directions of print output of the right and left pages become same without pre-scanning.

What is claimed is:

1. A document reading apparatus comprising:
   means for imaging a document placed on a document holder from above;
   detecting means for detecting a position of a hand or a finger other than a document placed on the document holder based on an output from the imaging means; and
   processing means for processing the output from the imaging means based on an output from the detecting means.

2. A document reading apparatus as claimed in claim 1, wherein the detecting means detects a hand or a finger on the basis of its difference from the document in luminous density.

3. A document reading apparatus as claimed in claim 1, wherein the detecting means detects a hand or a finger by means of color detection.

4. A document reading apparatus as claimed in claim 1, wherein the detecting means performs a detecting operation within a predetermined area on a document.

5. A document reading apparatus as claimed in claim 4, wherein the predetermined area of detection is determined depending on a document size.

6. A document reading apparatus as claimed in claim 1 wherein the processing means replaces any detected hand or finger output from the means for imaging with a white output signal.

7. A document reading apparatus as claimed in claim 1 wherein the detecting means includes a counter for generating pulses and means for judging if the counted pulses represent a hand or a finger.

8. A document reading apparatus as claimed in claim 1 wherein the detecting means includes an infrared detector.

9. A document reading apparatus comprising:
   means for imaging a document placed on a document holder from above;
   detecting means for detecting a position of a hand or a finger other than a document placed on the document holder based on an output from the imaging means; and
   processing means for processing to delete an image data of the object, on the basis of detecting the result of the detecting means.

10. A document reading apparatus as claimed in claim 9, wherein the detecting means performs a detecting operation within a predetermined area on a document.

11. A document reading apparatus comprising:
    a first imaging means for imaging a document placed on a document holder and obtaining a picture element output of three colors of red, green, and blue;
    calculating means for calculating a chromaticity of two specified colors from the imaged picture element output of three colors of red, green, and blue;
    judging means for judging, from the chromaticity of the two colors, whether or not the imaged picture element output is of a predetermined color;
    a second imaging means for imaging the document; and
    rectifying means for rectifying to delete an image data of the second imaging means on the basis of a judgment result of the judging means.

12. A document reading apparatus comprising:
    a first imaging means for imaging a document placed on a document holder and obtaining a picture element output of three colors of red, green, and blue, wherein a flesh color region is detected;
    calculating means for calculating chromaticity of two specified colors from the imaged picture element output of three colors of red, green, and blue;
    judging means for judging, from the chromaticity of the two colors, whether or not the imaged picture element output is of a predetermined color;
    a second imaging means for imaging the document, wherein an image region containing characters or pictures is detected;
    rectifying means for rectifying an output from the said second imaging means on the basis of an output from the above judging means; and
    a warning means for warning when the flesh color region and the image region are overlapping.

13. A document reading apparatus comprising:
    means for scanning a document to provide image signals;
    first means for processing the image signals to determine that portion of the scanned document image signals that contains printing;
    second means for processing the image signals to determine that portion of the scanned document image signals that represents a hand or a finger; and
    means for providing a warning to an operator when the second means determines a hand or a finger are represented in the image signals.

14. A document reading apparatus comprising:
    means for scanning a document to provide image signals;
    first means for initially scanning the document with the scanning means to determine that portion of the scanned document image signals that represents a hand or a finger and storing the same; and
    second means for subsequently scanning the document to provide image signals with that portion of the document including a hand or a finger removed from the image signals.

15. A document reading apparatus comprising:

an imager for imaging a document placed on a document holder;

a detector for detecting a position of a hand or a finger other than a document placed on the document holder based on an output from the imaging means; and a processor for processing the output from the images based on an output from the detector.

16. A document reading apparatus as claimed in claim 15, wherein the detector detects a hand or a finger on the basis of its difference from the document in luminous density.

17. A document reading apparatus as claimed in claim 15, wherein the detector detects a hand or a finger by means of color detection.

18. A document reading apparatus as claimed in claim 15, wherein the detector performs a detecting operation within a predetermined area on a document, which is less than the overall area of the document.

19. A document reading apparatus as claimed in claim 18, wherein the predetermined area of detection is determined depending on a document size.

20. A document reading apparatus comprising:
an imager for imaging a document placed on a document holder from above;
a detector for detecting a position of a hand or a finger other than a document placed on the document holder based on an output from the imager; and
a processor for processing the imager output to delete an image data of a hand or a finger, on the basis of the detected results of the detector.

21. A document reading apparatus as claimed in claim 20, wherein the detector performs a detecting operation only within a predetermined area on a document.

22. A document reading apparatus comprising:
an imager for imaging a document placed on a document holder from above;
a detector for detecting an area of luminous density above a predetermined value within a predetermined area of the document, based on an output from the imager in the predetermined area of the document, the predetermined area being positioned at an end portion of the document and not influenced by any luminous density of image information of the document to be imaged; and
a processor for processing an output of the imager to delete any image data corresponding to the area of the luminous density above the predetermined value in the predetermined area, based on an output from the detector.

23. A document reading apparatus as claimed in claim 22, wherein the predetermined area of detection is determined depending on a document size.

24. A document reading apparatus comprising:
an imager for imaging a document placed on a document holder from above;
a detector for detecting a position of an object other than a document placed on the document holder based on an output from the imager; and
a processor for processing an output of the imager to delete any image data of the object on the basis of the detected result of the detector.

* * * * *